(12) United States Patent
Letscher et al.

(10) Patent No.: US 10,899,170 B2
(45) Date of Patent: Jan. 26, 2021

(54) ADDITIONAL WHEEL WEIGHT FOR A UTILITY VEHICLE

(71) Applicant: Deere & Company, Moline, IL (US)

(72) Inventors: Jens Letscher, Ludwigshafen (DE); Xaver Witzelsperger, Ergolding (DE); Michael Schmid, Ergolding (DE); Verena Schmeller, Ergolding (DE)

(73) Assignee: DEERE & COMPANY, Moline, IL (US)

( * ) Notice: Subject to any disclaimer, the term of this patent is extended or adjusted under 35 U.S.C. 154(b) by 192 days.

(21) Appl. No.: 15/995,299

(22) Filed: Jun. 1, 2018

(65) Prior Publication Data

US 2018/0345721 A1 Dec. 6, 2018

(30) Foreign Application Priority Data

Jun. 1, 2017 (DE) .................. 10 2017 209 308

(51) Int. Cl.
*B60B 15/28* (2006.01)
*B62D 49/06* (2006.01)
(Continued)

(52) U.S. Cl.
CPC .......... *B60B 15/28* (2013.01); *B62D 49/0621* (2013.01); *F16F 15/324* (2013.01);
(Continued)

(58) Field of Classification Search
CPC .... B60B 15/28; B62D 49/0621; F16F 15/324; F16F 15/345
See application file for complete search history.

(56) References Cited

U.S. PATENT DOCUMENTS 2,123,861 A * 7/1938 Shields .................. B60B 15/28
301/53.5
2,859,065 A * 11/1958 Darby .................... B60B 15/28
301/53.5
(Continued)

FOREIGN PATENT DOCUMENTS

CH 450933 A 5/1968
DE 1279496 B 10/1968
(Continued)

OTHER PUBLICATIONS

German Search Report issued in counterpart application No. 102017209308.0 dated Feb. 2, 2018. (10 pages).
(Continued)

*Primary Examiner* — Kip T Kotter

(57) ABSTRACT

An additional wheel weight for a utility vehicle includes a weight plate and a retention member configured to be fitted to a wheel and on which the weight plate is guided in a longitudinally axial manner. A clamping lever closure is disposed between the weight plate and retention member. A first assembly element of the clamping lever closure is coupled to the retention member, a second assembly element of the clamping lever closure engages the weight plate in a longitudinally axial manner, and a lever mechanism is disposed between the first and second assembly elements. The lever mechanism includes a clamping element being releasably secured to the first assembly element and an actuation lever being articulated between the second assembly element and the clamping element.

18 Claims, 4 Drawing Sheets

(51) Int. Cl.
*F16F 15/32* (2006.01)
*F16F 15/34* (2006.01)
*B60B 11/08* (2006.01)
*B60B 11/02* (2006.01)

(52) U.S. Cl.
CPC ............ *F16F 15/345* (2013.01); *B60B 11/02* (2013.01); *B60B 11/08* (2013.01); *B60B 2900/531* (2013.01); *B60B 2900/541* (2013.01); *B60B 2900/551* (2013.01); *B60B 2900/721* (2013.01); *B60Y 2200/22* (2013.01); *B60Y 2200/221* (2013.01); *F16F 2230/0011* (2013.01)

(56) References Cited

U.S. PATENT DOCUMENTS

| | | | | |
|---|---|---|---|---|
| 3,644,002 | A * | 2/1972 | Barth | B60B 15/28 301/53.5 |
| 4,400,038 | A | 8/1983 | Hosokawa | |
| 5,873,636 | A | 2/1999 | Messina et al. | |
| 6,062,651 | A | 5/2000 | Schaad et al. | |
| 6,132,007 | A * | 10/2000 | Harmsen | B60B 15/28 301/53.5 |
| 6,283,556 | B1 * | 9/2001 | Taylor | B60B 15/28 301/53.5 |
| 9,752,647 | B2 * | 9/2017 | Rockl | B60B 15/28 |
| 2004/0046353 | A1 * | 3/2004 | Neugent | B62K 25/02 280/274 |
| 2005/0280308 | A1 * | 12/2005 | Thomas | B60B 15/28 301/53.5 |
| 2013/0342002 | A1 * | 12/2013 | Roth | B60B 15/28 301/53.5 |
| 2016/0341276 | A1 * | 11/2016 | Rockl | B60B 15/28 |
| 2018/0281512 | A1 | 10/2018 | Letscher et al. | |

FOREIGN PATENT DOCUMENTS

| | | |
|---|---|---|
| DE | 2700751 C2 | 8/1984 |
| DE | 10352331 A1 | 6/2005 |
| DE | 102014202074 A1 | 8/2015 |
| EP | 0094916 A1 | 11/1983 |
| EP | 0854791 A1 | 7/1998 |
| EP | 1529656 A2 | 5/2005 |
| EP | 3385085 A1 | 10/2018 |

OTHER PUBLICATIONS

European Search Report issued in counterpart application No. 18169467.0 dated Oct. 31, 2018. (7 pages).

European Search Report issued in counterpart application No. 18163289.4 dated Sep. 6, 2018 (07 pages).

German Search Report issued in counterpart application No. 102017205465.4 dated Nov. 29, 2017 (10 pages).

* cited by examiner

ADDITIONAL WHEEL WEIGHT FOR A UTILITY VEHICLE

RELATED APPLICATIONS

This application claims priority to German Patent Application Ser. No. 10 2017 209 308.0, filed Jun. 1, 2017, the disclosure of which is hereby incorporated by reference in its entirety.

FIELD OF THE DISCLOSURE

The present disclosure relates to an additional wheel weight for a utility vehicle, having a weight plate and a retention member which can be fitted to a wheel for securing the weight plate.

BACKGROUND

An additional wheel weight for ballasting a drive axle of an agricultural tractor is known, for example, from DE 10 2014 202 074 A1. The additional wheel weight includes an adapter plate which can be secured to a wheel by means of a ring of screws and a weight plate which can be fitted to the adapter plate. In order to simplify the correct positioning of the weight plate, a plurality of conical abutment faces or encoding formations and spacer domes which engage one in the other are provided. The ultimate assembly is carried out in this instance by means of conventional screw bolts.

There is a need, however, a need for an additional wheel weight with an improved ease of handling thereof during assembly of the weight plate.

SUMMARY

In a first embodiment of the present disclosure, an additional wheel weight for a utility vehicle includes a weight plate and a retention member which can be fitted to a wheel and on which the weight plate is guided in a longitudinally axial manner, wherein between the weight plate and retention member there is provided a clamping lever closure which can be operated manually or by means of external force and which has a first assembly element which is fitted to the retention member, a second assembly element which engages in a longitudinally axial manner on the weight plate and a lever mechanism which is arranged between the two assembly elements and which has a clamping element which is releasably secured to the first assembly element and an actuation lever which is articulated between the second assembly element and the clamping element in such a manner that by pivoting the actuation lever between an open and a closed position a longitudinally axial spacing between the two assembly elements can be reduced for the purposes of clamping the weight plate with respect to the retention member.

In this manner, it is possible to assemble the weight plate in a vibration-resistant manner with few manipulations on the retention member.

The retention member has, for example, a hollow-cylindrical base member and a securing crown by means of which the retention member can be screwed to the wheel, wherein the weight plate can be fitted in a positive-locking manner on the hollow-cylindrical base member. Longitudinal ribs formed on the hollow-cylindrical base member reduce the friction with respect to the weight plate so that, during fitting, a comparatively small application of force is required.

The L-shaped second assembly element is supported in this instance in the region of a first member on a wall of the retention member or the hollow-cylindrical base member. A second member which extends perpendicularly thereto forms a clamping jaw, which serves to abut the weight plate.

For secure assembly of the weight plate, a plurality of clamping lever closures which are arranged in a uniform manner with respect to each other over the periphery of the weight plate are typically provided.

The two articulation locations of the actuation lever, on the one hand, on the second assembly element and, on the other hand, on the clamping element are arranged in such a manner with respect to each other that the path of the clamping force when pivoting the actuation lever has a maximum which is located between an open and closed position. This ensures that the actuation lever when the maximum is exceeded is pressed into the closed position and consequently the clamping lever closure has self-securing properties.

A plurality of inner and outer apertures which are provided in the weight plate serve to receive prongs of a fork type front loader or enable a pulley block to be suspended, which simplifies the handling of the weight plate when it is assembled on the retention member or the hollow-cylindrical base member. Typically, the weight plate formed of cast steel has a mass in the order of magnitude of 250 kg.

The first assembly element includes two opposing assembly walls through which a clamping bolt is guided in a transversely axial manner. The assembly walls may in this instance be welded to the carrier wall of the retention member or the hollow-cylindrical base member and protrude thereon in the form of associated securing lugs. The two securing lugs have transverse holes which are in alignment with each other for receiving the clamping bolt, wherein it is welded or riveted therein.

In this context, the term "longitudinally axial" is intended to be understood to mean that it refers to a spatial orientation along the longitudinal axis of the substantially rotationally symmetrical additional wheel weight, whereas the term "transversely axial" is directed towards an orientation transverse relative to the longitudinal axis of the substantially rotationally symmetrical additional wheel weight. The longitudinal axis of the additional wheel weight in this instance coincides with the rotation axis of the wheel.

Furthermore, it is possible for the clamping element to have an assembly hook which engages in the clamping bolt. This enables the clamping lever closure to be completely disengaged and, when not in use, to be stored in a tool box or the like. The clamping element can additionally have at a region facing away from the assembly hook a thread which extends through a clamping block which is articulated to the actuation lever and which is supported at an opposing side on the clamping block by means of a clamping nut. By rotating the clamping nut, the effective length of the clamping element between the clamping bolt and the articulation location of the clamping block on the actuation lever and consequently ultimately the clamping force which can be built up by means of the clamping lever closure in the closed position can be varied.

In addition, the lever mechanism can be secured in the closed position by a securing element. The securing element is, for example, a securing split pin which prevents the actuation lever from folding or pivoting out of the closed position. Securing flanges which are formed on the first member of the second assembly element may in this instance extend through the securing split pin.

In order to securely support the second assembly element or the clamping jaw which is formed thereon, the weight plate may have a peripheral groove or recess for engagement of a projection which is provided on the first assembly element. Since the groove or the recess is constructed in a peripheral manner, it is possible to assemble the weight plate in any orientation about the longitudinal axis.

The actuation lever has in particular a receiving member for an actuation tool, by means of which the actuation lever can be pivoted manually between the open and the closed position. The receiving member may in particular be constructed as a hollow pipe piece for the insertion of a hand-operated lever with a square or round cross-section, wherein the hollow pipe piece is welded to an outer side of the actuation lever. The hollow pipe piece is fitted in such a manner that the hand-operated lever in the closed position extends substantially along the longitudinal axis of the additional wheel weight. In order to pivot the actuation lever into the open position, it must be moved in the direction of the centre of the retention member or the hollow-cylindrical base member.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
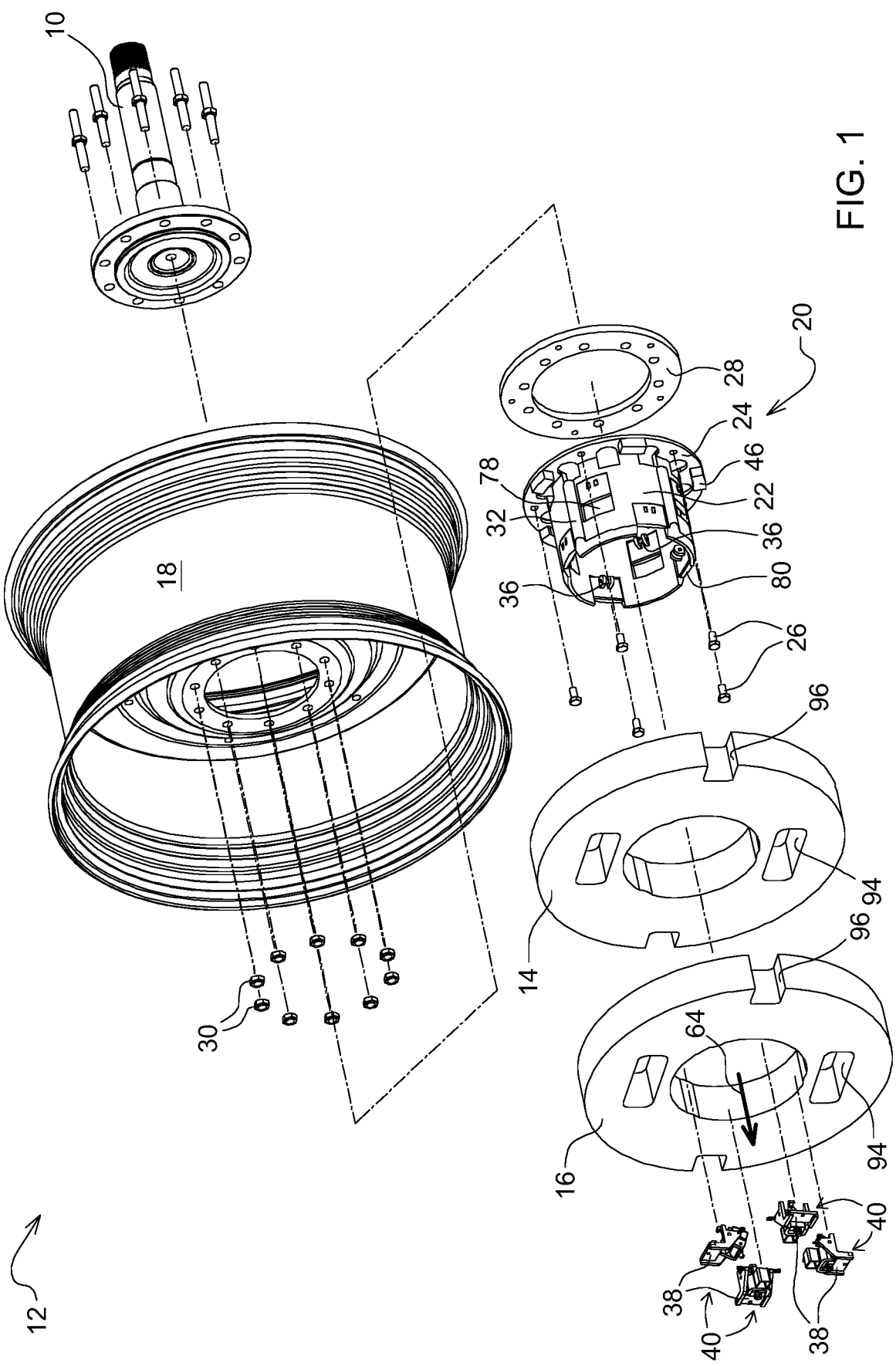
FIG. 1 is an exploded illustration of a first embodiment of the additional wheel weight including inner and outer weight plates and a retention member which can be fitted to a wheel.

Referring to FIG. 1, an exploded view of a first embodiment of an additional wheel weight 12 is shown. The additional wheel weight 12 is provided by way of example on a rear axle 10 of an agricultural tractor (not shown) having an inner and an outer weight plate 14, 16 and a retention member 20 which can be fitted to a wheel 18. The retention member 20 has a hollow-cylindrical base member 22 and a securing crown 24 by means of which the retention member 20 is screwed to the wheel 18 using associated assembly bolts 26. In the present case, the screwing of the securing crown 24 is not carried out directly on the wheel 18, but instead on an intermediate carrier 28 which is secured to the wheel 18 by means of rim nuts 30.

The weight plates 14, 16 can be fitted onto the hollow-cylindrical base member 22 in a positive-locking manner so that they are guided in a longitudinally axial manner on the retention member 20. Longitudinal ribs 32 formed on the hollow-cylindrical base member 22 reduce the friction with respect to the weight plates 14, 16 so that a comparatively small application of force is required during the fitting operation. In contrast to the illustration, the longitudinal ribs may also be provided on the weight plates 14, 16 and may be in abutment with the hollow-cylindrical base member in a positive-locking manner.

Figure 2:
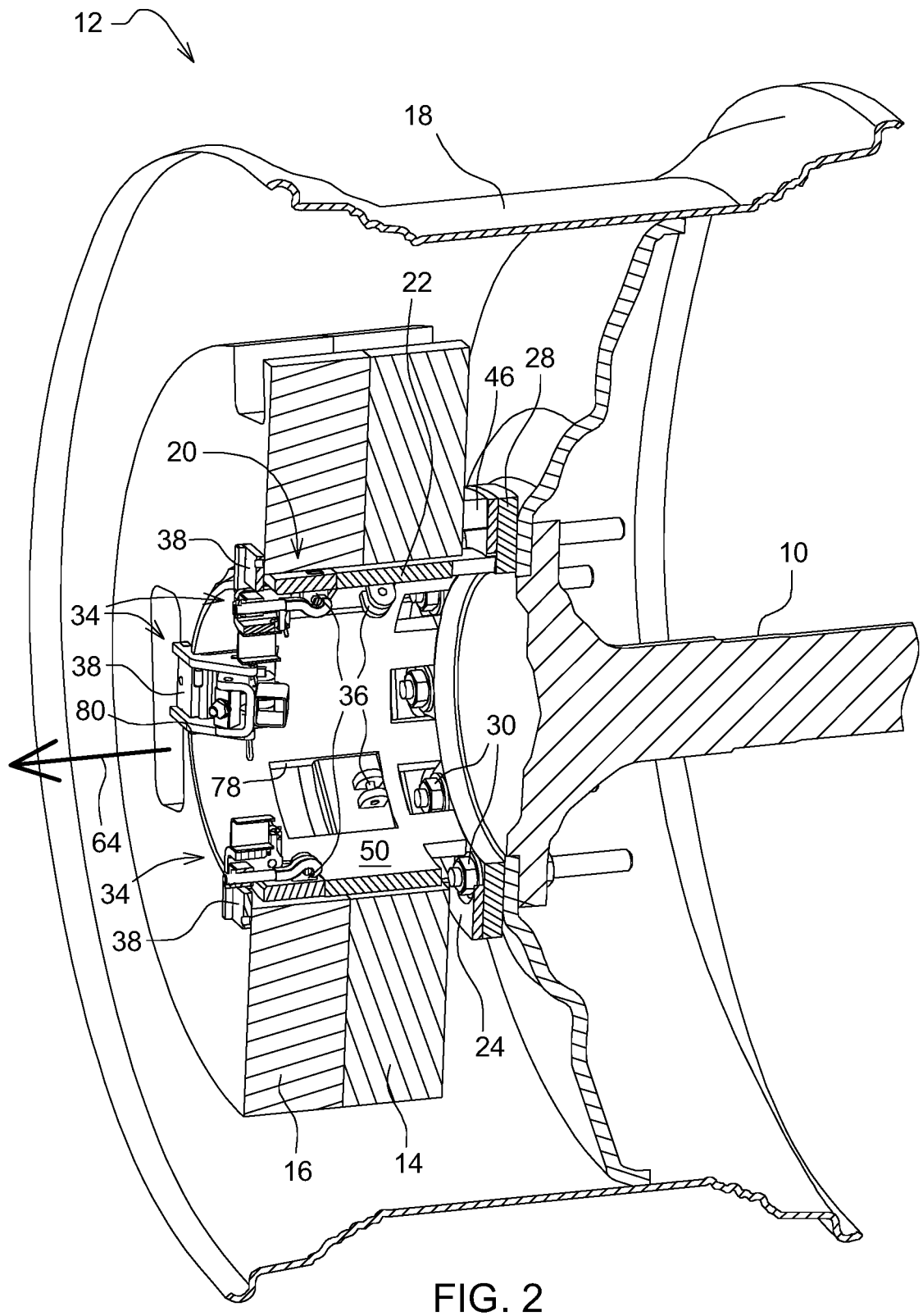
FIG. 2 is a cross-section of the additional wheel weight shown in FIG. 1 in the assembled state.

As can be seen in particular by a comparison with FIG. 2, in order to assemble the two weight plates 14, 16, clamping lever closures 34 which are arranged in an opposing manner and which are of an identical construction type are provided. These are in the present case arranged in a uniform manner over the periphery of the outer weight plate 16 with an angular spacing of 90° relative to each other.

Figure 3:
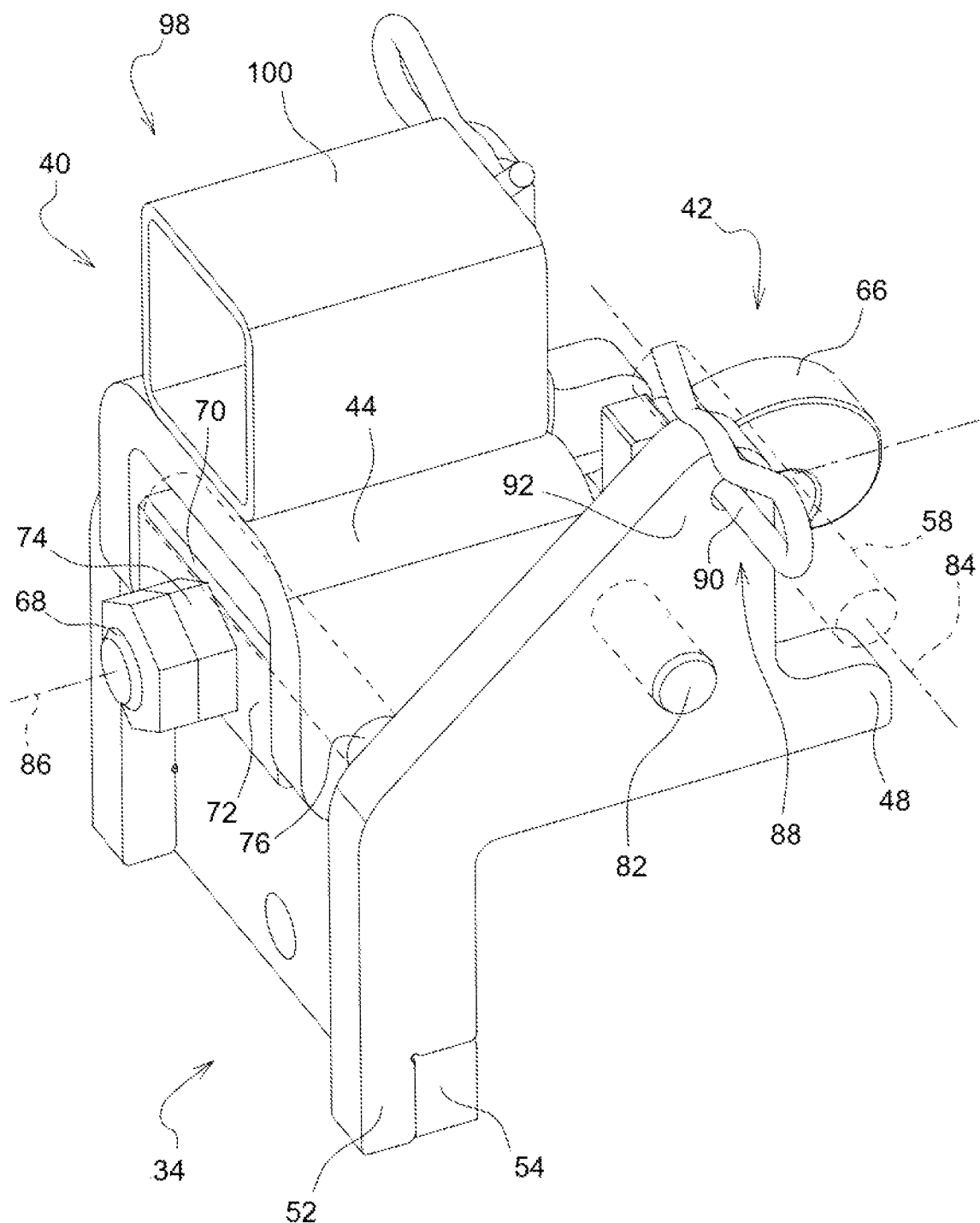
FIG. 3 is a partial perspective illustration of a clamping lever closure which is enclosed by the additional wheel weight according to FIG. 1.
Figure 4:
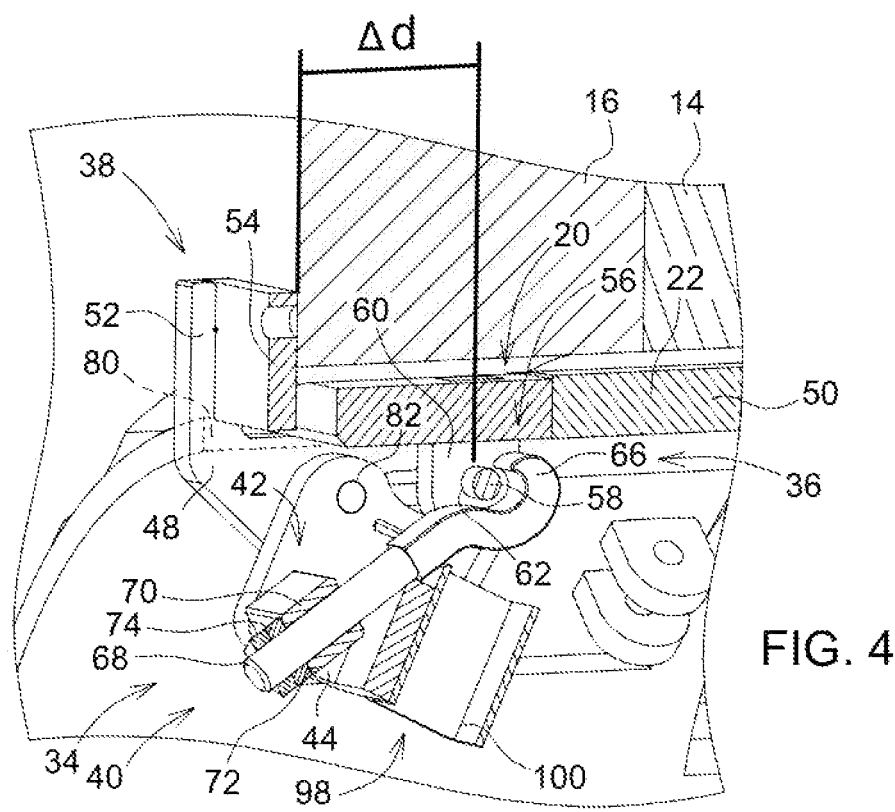
FIG. 4 is a cross-section of the clamping lever closure according to FIG. 3 in an open position.
Figure 5:
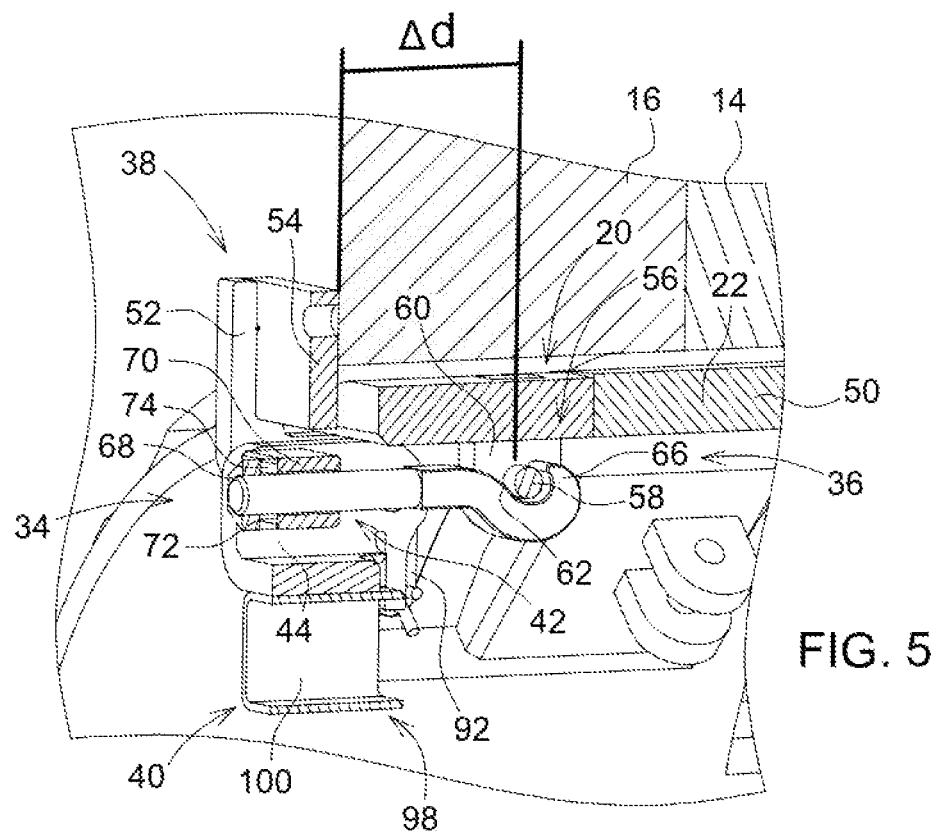
FIG. 5 is a cross-section of the clamping lever closure according to FIG. 3 in a closed position.

One of the clamping lever closures 34 is shown as a perspective detailed illustration in FIG. 3, wherein it is illustrated in FIG. 4 and FIG. 5 in the assembled state in an open or closed position.

Accordingly, the clamping lever closure 34 has a first assembly element 36 which is fitted to the retention member 20 or the hollow-cylindrical base member 22 (see FIGS. 4 and 5), a second assembly element 38 which engages on the outer weight plate 16 and a lever mechanism 40 which is arranged between the two assembly elements 36, 38. The lever mechanism 40 in turn comprises a clamping element 42 which is releasably secured to the first assembly element 36 and an actuation lever 44 which is articulated between the second assembly element 38 and the clamping element 42 in such a manner that, when the actuation lever 44 is pivoted between the open position according to FIG. 4 and the closed position according to FIG. 5, a longitudinally axial spacing Δd between the two assembly elements 36, 38 for the purposes of clamping the relevant weight plate 14, 16 with respect to the retention member 20 or the hollow-cylindrical member 22 is reduced. That is to say, the lever mechanism 40 forms a compression means, which presses the outer weight plate 16 against the inner weight plate 14 and the inner weight plate 14 against associated bearing blocks 46 on the retention member 20 and thus retains the two weight plates 14, 16 in the position thereof.

The clamping lever closures 34 used enable the weight plates 14, 16 to be assembled in any angular position on the retention member 20 or the hollow-cylindrical base member 22. In this instance, the L-shaped second assembly element 38 is supported in the region of a first member 48 on a carrier wall 50 of the retention member 20 or the hollow-cylindrical base member 22. A second member 52, which extends perpendicularly thereto, forms a clamping jaw 54 which is used for abutment against the weight plate 14, 16.

The first assembly element 36 comprises two opposing assembly walls 56, through which a clamping bolt 58 is guided in a transversely axial manner. The assembly walls 56 are in this instance welded to the carrier wall 50 of the retention member 20 or the hollow-cylindrical base member 22 and protrude thereon in the form of associated securing lugs 60. The two securing lugs 60 have transverse holes 62 which are in alignment with each other for receiving the clamping bolt 58, wherein it is welded or riveted therein.

In this context, the term "longitudinally axial" refers to a spatial orientation along a longitudinal axis 64 of the substantially rotationally symmetrical additional wheel weight 12, whereas the term "transversely axial" is directed towards an orientation transverse relative to the longitudinal axis 64 of the substantially rotationally symmetrical additional wheel weight 12. The longitudinal axis 64 of the additional wheel weight 12 in this instance coincides with the rotation axis of the wheel 18.

The clamping element 42 has an assembly hook 66 which engages in the clamping bolt 58. This enables the clamping lever closure 34 to be completely disengaged and, when not in use, to be stored in a tool box or the like. In addition, the clamping element 42 has at a region facing away from the assembly hook 66 a thread 68 which extends through a clamping block 70 which is articulated to the actuation lever 44 and which is supported at an opposing side 72 on the clamping block 70 by means of a counter-lockable clamping nut 74. By rotating the clamping nut 74, the effective length of the clamping element 42 between the clamping bolt 58 and the articulation location 76 of the clamping block 70 on the actuation lever 44 and consequently ultimately the clamping force which can be built up by means of the clamping lever closure 34 in the closed position can be varied.

If only the inner weight plate 14 is intended to be assembled, the clamping lever closures 34 are fitted internally. In this instance, the clamping lever closures 34, more specifically the second members 52 thereof which are constructed as clamping jaws 54, engage through the carrier wall 50 of the retention member 20 or the hollow-cylindrical base member 22 in the region of corresponding recesses 78 (see in this regard in particular FIG. 2). In contrast, in the case of assembly of both weight plates 14, 16, the corresponding recesses 80 are cut so that the retention member 20 or the hollow-cylindrical base member 22 terminates at the end face in a flush manner with an outer side of the outer weight plate 16.

According to FIG. 4 or 5, the two articulation locations 76, 82 of the actuation lever 44 are arranged, on the one hand, on the second assembly element 38 and, on the other hand, on the clamping element 42 in such a manner with respect to each other that the path of the clamping force when pivoting the actuation lever 44 has a maximum which is located between the open and closed position. To this end, the center axis 84 of the clamping bolt 58 and the articulation location 76 of the articulation block 70 are located on a connection line 86 which extends parallel with the longitudinal axis 64, whereas the articulation location 82 of the actuation lever 44 is positioned on the second assembly element 38 therebetween and in the pivot direction of the actuation lever 44 so as to be offset transversely relative thereto. This ensures that the actuation lever 44 when the maximum is exceeded is pressed into the closed position and therefore the clamping lever closure 34 has self-securing properties. The clamping action of the lever mechanism 40 is in this instance ultimately built up by the lengthening of the clamping element 42 when the actuation lever 44 is moved into the closed position.

In addition, the lever mechanism 40 can be secured in the closed position shown in FIG. 5 by means of a securing element 88. The securing element 88 is a securing split pin 90 which prevents folding out or pivoting out of the actuation lever 44 from the closed position. Securing flanges 92 which are formed on the first member 48 of the second assembly element 38 extend through the securing split pin 90 in this instance.

In contrast to the embodiment illustrated in FIG. 2, the weight plates 14, 16 for secure support of the second assembly element 38 or the clamping jaw 54 which is formed thereon may each have a peripheral groove or recess in which a projection which is provided on the first assembly element 36 engages (not shown).

A plurality of inner and outer apertures 94, 96 provided on the weight plates 14, 16 serve to receive prongs of a fork type front loader or enable a pulley block to be suspended, which simplifies the handling of the weight plates 14, 16 when they are assembled on the retention member 20 or the hollow-cylindrical base member 22. Typically, the weight plates 14, 16 are produced from cast steel and have a mass in the order of magnitude of 250 kg.

Furthermore, the actuation lever 44 has a receiving member 98 for an actuation tool by means of which the actuation lever 44 can be pivoted manually between the open and the closed position. The receiving member 98 is constructed as a hollow pipe piece 100 for the insertion of a hand-operated lever (not illustrated) with a square cross-section, wherein the hollow pipe piece 100 is welded to an outer side of the actuation lever 44. The hollow pipe piece 100 is fitted in such a manner that the hand-operated lever in the closed position extends substantially along the longitudinal axis 64 of the additional wheel weight 12. In order to pivot the actuation lever 44 into the open position, it has to be moved in the direction of the center of the retention member 20 or the hollow-cylindrical base member 22.

For the sake of completeness, it should be noted that the additional wheel weight can also be arranged on a front axle of the agricultural tractor, wherein for each of the front wheels in most cases only a single weight plate is provided here. In place of an agricultural tractor, any other utility vehicle may also be used such as, for example, an agricultural vehicle of any construction type or a construction or forest machine.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An additional wheel weight for a utility vehicle, comprising:
   a weight plate and a retention member configured to be fitted to a wheel and on which the weight plate is guided in a longitudinally axial manner;
   a clamping lever closure disposed between the weight plate and retention member, the clamping lever closure being operable manually or via an external force;
   a first assembly element of the clamping lever closure coupled to the retention member;
   a second assembly element of the clamping lever closure engaging the weight plate in a longitudinally axial manner;
   a lever mechanism disposed between the first and second assembly elements, the lever mechanism comprising a clamping element being releasably secured to the first assembly element and an actuation lever being articulated between the second assembly element and the clamping element;
   wherein, a pivotal movement of the actuation lever between an open position and a closed position induces a reduction of a longitudinally axial spacing between the first and second assembly elements in order to clamp the weight plate with respect to the retention member;

wherein the retention member comprises a hollow-cylindrical base member and a securing crown which the retention member is screwed to the wheel using one or more bolts.

2. The additional wheel weight of claim 1, wherein the first assembly element comprises two opposing assembly walls through which a clamping bolt is guided in a transversely axial manner.

3. The additional wheel weight of claim 2, wherein the clamping element comprises an assembly hook disposed in engagement with the clamping bolt.

4. The additional wheel weight of claim 1, wherein the lever mechanism is securely disposed in the closed position by a securing element.

5. The additional wheel weight of claim 1, further comprising longitudinal ribs formed on the base member for reducing a frictional force between the weight plate and the base member during assembly.

6. The additional wheel weight of claim 1, wherein the actuation lever comprises a receiving member for an actuation tool, the actuation lever being pivotal between the open and the closed positions via the receiving member.

7. An agricultural working vehicle, comprising:
a chassis having at least one axle;
an additional wheel weight disposed on the axle, the additional wheel weight comprising:
at least one weight plate and a retention member configured to be fitted to a wheel and on which the at least one weight plate is guided in a longitudinally axial manner;
a clamping lever closure disposed between the at least one weight plate and retention member, the clamping lever closure being operable manually or via an external force;
a first assembly element of the clamping lever closure coupled to the retention member;
a second assembly element of the clamping lever closure engaging the at least one weight plate in a longitudinally axial manner; and
a lever mechanism disposed between the first and second assembly elements, the lever mechanism comprising a clamping element being releasably secured to the first assembly element and an actuation lever being articulated between the second assembly element and the clamping element;
wherein, a pivotal movement of the actuation lever between an open position and a closed position induces a reduction of a longitudinally axial spacing between the first and second assembly elements in order to clamp the at least one weight plate with respect to the retention member;
wherein the retention member comprises a hollow-cylindrical base member and a securing crown which the retention member is screwed to the wheel using one or more bolts.

8. The vehicle of claim 7, wherein the first assembly element comprises two opposing assembly walls through which a clamping bolt is guided in a transversely axial manner.

9. The vehicle of claim 8, wherein the clamping element comprises an assembly hook disposed in engagement with the clamping bolt.

10. The vehicle of claim 7, wherein the lever mechanism is securely disposed in the closed position by a securing element.

11. The vehicle of claim 7, further comprising longitudinal ribs formed on a base member for reducing a frictional force between the at least one weight plate and the base member during assembly.

12. The vehicle of claim 7, wherein the actuation lever comprises a receiving member for an actuation tool, the actuation lever being pivotal between the open and the closed positions via the receiving member.

13. An additional wheel weight for a utility vehicle, comprising:
a first weight plate, a second weight plate, and a retention member configured to be fitted to a wheel and on which the first and second weight plates are guided in a longitudinally axial manner;
a clamping lever closure disposed between the first and second weight plates and retention member, the clamping lever closure being operable manually or via an external force;
a first assembly element of the clamping lever closure coupled to the retention member;
a second assembly element of the clamping lever closure engaging the first and second weight plates in a longitudinally axial manner;
a lever mechanism disposed between the first and second assembly elements, the lever mechanism comprising a clamping element being releasably secured to the first assembly element and an actuation lever being articulated between the second assembly element and the clamping element;
wherein, a pivotal movement of the actuation lever between an open position and a closed position induces a reduction of a longitudinally axial spacing between the first and second assembly elements in order to clamp the first and second weight plates with respect to the retention member;
wherein the retention member comprises a hollow-cylindrical base member and a securing crown which the retention member is screwed to the wheel using one or more bolts.

14. The additional wheel weight of claim 13, wherein the first assembly element comprises two opposing assembly walls through which a clamping bolt is guided in a transversely axial manner.

15. The additional wheel weight of claim 14, wherein the clamping element comprises an assembly hook disposed in engagement with the clamping bolt.

16. The additional wheel weight of claim 13, wherein the lever mechanism is securely disposed in the closed position by a securing element.

17. The additional wheel weight of claim 13, wherein the actuation lever comprises a receiving member for an actuation tool, the actuation lever being pivotal between the open and the closed positions via the receiving member.

18. The additional wheel weight of claim 13, further comprising longitudinal ribs formed on the base member for reducing a frictional force between the first and second weight plates and the base member during assembly.

* * * * *